Figure 1:

United States Patent [19]

Tsuchida et al.

[11] 4,137,217

[45] Jan. 30, 1979

[54] POLYION COMPLEX AND METHOD FOR PREPARING THE SAME

[75] Inventors: Eishun Tsuchida, 1-141, Sekimachi, Nerima-ku, Tokyo, Japan; Yoshihito Osada, Yokohama, Japan

[73] Assignee: Eishun Tsuchida, Tokyo, Japan

[21] Appl. No.: 790,085

[22] Filed: Apr. 22, 1977

Related U.S. Application Data

[63] Continuation of Ser. No. 373,954, Jun. 27, 1973, abandoned.

[30] Foreign Application Priority Data

Jul. 1, 1972 [JP] Japan ................................. 47-66239

[51] Int. Cl.² .......................... C08F 8/32; C08G 69/34; C08G 69/28
[52] U.S. Cl. ................................... 260/837 R; 526/14; 526/15; 260/857 R; 260/873

[58] Field of Search ........ 260/47 UA, 47 CP, 47 CZ, 260/78 TF, 78 UA, 78.41, 78 A, 830 R, 857 R, 873; 526/14, 15

[56] References Cited

U.S. PATENT DOCUMENTS

| 2,765,228 | 10/1956 | Jordan, Jr. ................................. 92/3 |
| 2,765,229 | 10/1956 | McLaughlin ............................ 92/21 |

*Primary Examiner*—Lester L. Lee
*Attorney, Agent, or Firm*—Bacon & Thomas

[57] ABSTRACT

A fibrous polyion complex or a polyion complex shapable to a mass or a film is prepared by reacting polycation having polymerization degree of not less than 5 or polyamine having polymerization degree of not less than 6 with polycarboxylic acid having polymerization degree of not less than 5. At least one of the reactants may preferably be of long chain polymer if fibrous polyion complex is desired.

4 Claims, 5 Drawing Figures

200μ

100μ

100μ

100μ

200μ

20μ

POLYION COMPLEX AND METHOD FOR PREPARING THE SAME

This is a continuation of application No. 373,954, filed June 27, 1973, now abandoned.

This invention relates to the preparation of polyion complex.

It is conventionally known that when two kinds of high molecular electrolytes exhibiting charges opposite to each other, such as aqueous solutions of polyvinyl trimethylbenzyl ammonium chloride and polystyrene sodium sulfonate are mixed, a reaction proceeds rapidly to give a polyion complex (see Encyclopedia of Polymer Science and Technology vol. 47, No. 3, P 177 (1969), John Wiley & Sons Inc.). Products from the conventional reaction are water-insoluble gel and, under the swelling condition, show plasticity. Under the dry condition, however, it is very difficult to make them into a film or to mould them due to the brittleness of the products. It is natural for the products to be brittle and poor in yieldability, since the resultant polyion complex is of network structure and the high molecular chains constituting the complex are strongly bound by the ions.

This invention relates to the preparation of polyion complex obtaining shaped articles or films or fibrous polyion complex.

A primary object of this invention is to prepare a fibrous polyion complex through the reaction of an integral type polycation with carboxylic acid. Another object of this invention is to prepare a fibrous polyion complex by causing a reaction between an integral type polycation and monomers of carboxylic acid under the presence or absence of a radical polymerization initiator. A further object of this invention is to prepare polyion complex by reacting a carboxylic acid with polycations having a hydroxyl group in a chain or polycations having a quaternary ammonium salts in a side chain. A still further object of this invention is to provide polyion complex by complexing a chain polyamine polymer and polycarboxylic compound.

This invention can be more fully understood from the following detailed description when taken in connection with reference to the accompanying drawings, in which:

FIGS. 1 to 6 are enlarged photographic representations showing a growth process of the fiber of polyion complex obtained according to this invention.

Let us now show a list of an integral type polycation and a polycation having quaternary ammonium salts in side chain.

general formula (a)

$$\left\{ -\underset{\underset{R_3}{|}}{\overset{\underset{R_2}{|}}{N^{\oplus}}} - R_1 - \underset{\underset{R_6}{|}}{\overset{\underset{R_5}{|}}{N^{\oplus}}} - R_4 - \right\}_n$$
$$X^{\ominus} \quad X^{\ominus}$$

general formula (b)

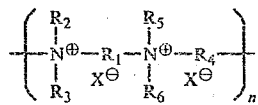

general formula (c)

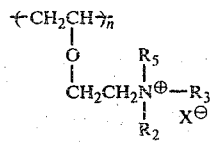

-continued

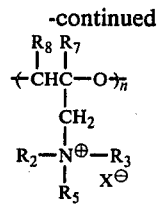

general formula (d)

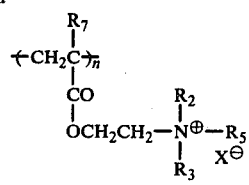

general formula (e)

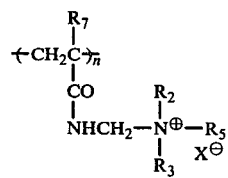

in which
R$_1$ and R$_4$ stand for alkylene, aralkylene, allylene groups, piperazine ring (piperazine ring replacing the structure formed of two nitrogen atoms adjacent to R$_1$or R$_4$, and R$_2$, R$_3$, R$_5$ and R$_6$ bonded to each nitrogen),alicyclic groups, alkylene alcohol, aralkylene alcohol, alkylenehydroxyether, aralkylenehydroxylether, aralkylenehydroxyester or amine derivatives thereof; R$_2$, R$_3$, R$_5$ and R$_6$ represent alkyl and alkyl alcohol having three carbons and less, phenylalkyl groups or benzylalkyl groups; R$_7$ and R$_8$ denote hydrogen atoms or methyl groups; X$^-$ stands for counter ions; and n represents an integer of 5 or more, preferably 10 or more.

The following are examples showing an integral type polycation as shown in the general formula (a). For the sake of simplicity the examples are restricted to R$_1$ - R$_4$ and R$_2$ = R$_3$ = R$_5$ = R$_6$. It should be noted that m, n and p represent an integer. Though Cl$^-$ is illustrated as a counter ion, it will be evident to those skilled in the art that the counter ion is not restricted to the illustrated examples and includes anions such as the other halogens and etc.

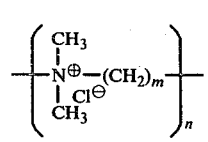
(1)

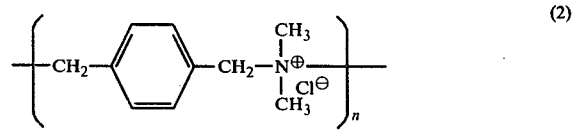
(2)

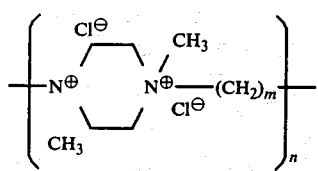
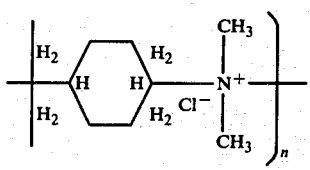
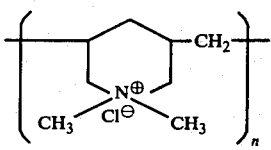
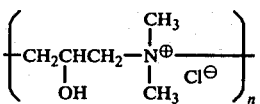
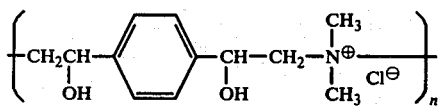
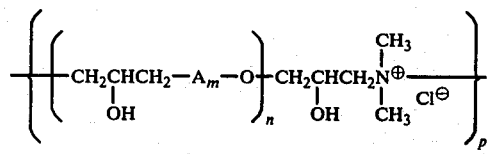
in which A represents
—OCH$_2$CH$_2$—
or —OCH$_2$CH—
　　　　|
　　　　CH$_3$
or —O(CH$_2$)$_4$—
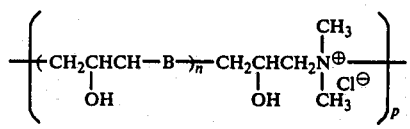
in which B represents
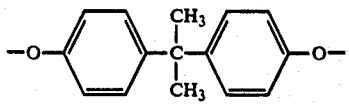
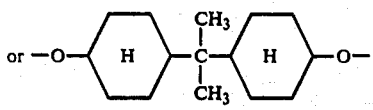
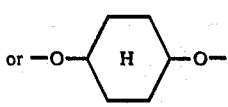
(3) 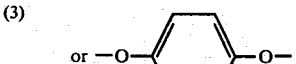
or 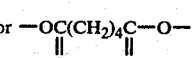
(4) 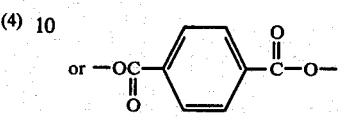
(5) 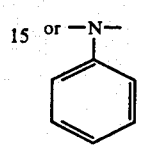
or 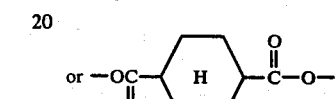
(6) or 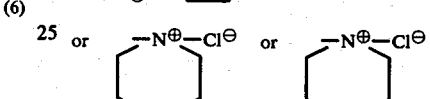
(7) or 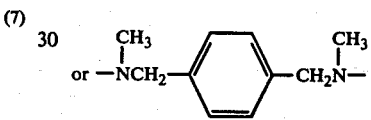
(8) or 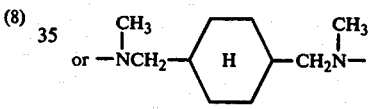
or 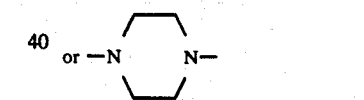
Illustrated below are polycations having quaternary ammonium salts i.e. examples as illustrated in general formulas (b) — (e)
(9) 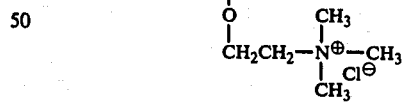

-continued

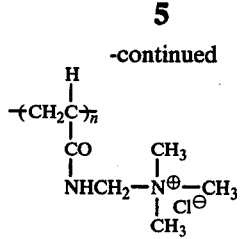
(13)

Polyamine polymers are used in this invention are:

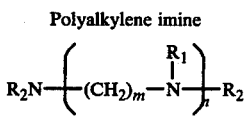

Polyalkylene imine (14)

in which
R$_1$ denotes hydrogen atoms, methyl groups, ethyl groups or propyl groups; R$_2$ denotes hydrogen atoms, alkyl groups having three carbons or less, terminal functional alkyl, acetyl, alkyl ketone or derivatives thereof; and m stands for integers of 2-6 and n, integers of 5 or more.

basic polyaminoacid, for example (15)

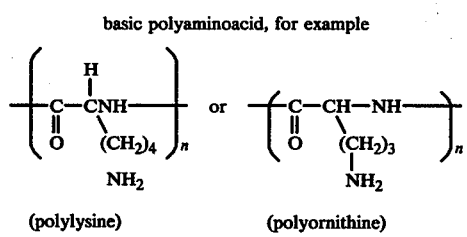

(polylysine)    (polyornithine)

in which n represents an integer.

the other polyamine like as basic polyaminoaxid or polyamine containing basic nitrogen in the molecules, for example (16)

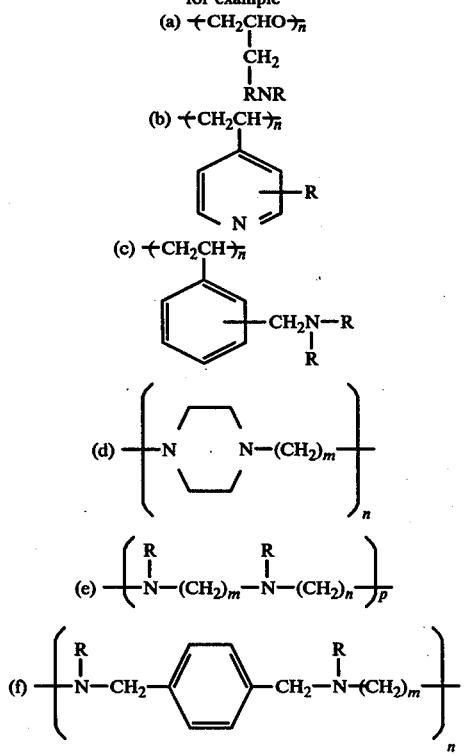

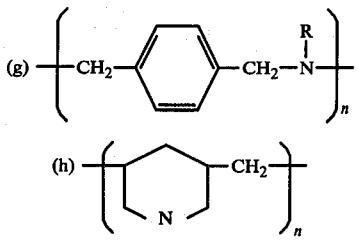

in which
R appearing in the above general formula represents hydrogen atoms, methyl groups, ethyl groups or propyl groups.

Polyanions to be reacted with these polycations or polyamines are carboxylic acids having a polymerization degree of 5 or more, preferably 100 or more; the carboxylic acid being, for example, polyacrylic acid, polymethacrylic acid, polymaleic acid, polyitaconic acid, aspartic acid, polyglutamic acid and the various copolymers containing at least one of these acids.

According to this invention a fibrous polyion complex or a coagulated polyion complex is obtained. Let us now explain the production mechanism, at first, the fibrous polyion complex.

Polyanions to be employed in this invention are all weak acids as mentioned above, and the aqueous solution thereof does not generally include dissociated carboxylic groups of more than several percent. It is considered that the dissociated carboxylanion group is united, under the influence of a coulomb force, with the plus charges of a polycation to give a loop-like polyion complex. In this way, polyion complex having a lesser number of bonds per chain is entirely distinguishable from polyion complex present between a strong acid and a strong base and leaves many water-soluble components of the polymer ununited in a chain. Therefore, no immediate precipitation occurs from the mixed solution of the polycation and polyanion.

As compared with the status wherein each individual component polymer is in the state of dissolution, polymer complex thus formed in the solution is thermodynamically less stable due to the increase in free energy of mixing of the complex with the solvent, which is brought about by the decrease in electric charge and increase in hydrophobic portion as a result of the above-mentioned ionic bond.

Accordingly, when these polyion complex solutions are allowed to stand for a period of from several hours to several days max., a fibril-like insoluble polyion complex is gradually precipitated under appropriate conditions such as in the reaction system between integral type polycation and polyacrylic acid or polymethacrylic acid.

With the progress of time the polyion complex is coagulated to form a fibrous material. The coagulated polyion complex can be developed with the lapse of time into a still greater fibrous group. The so developed polyion complex fiber is taken out from the solution and microscopically observed. Then, it will be found that it consists of fine fibers (several microns in diameter). The respective fibers may be further developed to about 10 microns and later entangled randomly to form a complete fiber network.

Thicker fibers (about 10μ) formed at first from the groups of complex molecule having a directivity or orientation are found to have a molecular orientation by observing through a polarizing microscope.

In reacting polycation with polycarboxylic acid, the solutions are preferably adjusted in concentration to below 10% and gradually mixed to form a polyion complex. It is also preferred that the resultant polyion complex is subjected to aging for an appropriate period of time to facilitate the formation and growth of fibers. The reason for selecting the solution concentration of the polycation and polycarboxylic acid to below 10% is that the resultant fiber molecules are necessarily dissolved at a relatively stretched state. When the more concentrated solution is used, the chain of polyion complex is formed into a "random coil" shape. In this case, the corresponding complex formed will never develop into a fibrous material, since it is difficult to effect an orientational growth. A reaction temperature is about in the range of about 0°– 80° C, preferably about 20°– 50° C. It is preferred that the aging of polyion complex is effected while the solution is agitated by a stirring means to form a laminar flow in the system. The method for manufacturing such polyion complex fibers is first invented by the inventors. The fiber constituting component polymers permits use for various industrial purposes, due to their featuring configurations, for example as a non-woven fabric filter membrane, self-extinguishing fiber or film, anti-static fiber, industrial filling material etc.

Another object of this invention is to manufacture fibers from polyion complex solution obtained by polymerizing in the presence of said integral type polycation, acrylic acid or methacrylic acid under a suitable pH, through addition of radical initiator, by subjection to radiation or by the way of thermal polymerization.

With the polyion complex so obtained, growth chain is generally extended along polycation chain and under the strong interaction a very regular structure is obtained. Since polycation is integral type, there is obtained a viscus hydrophilic polyion complex solution having a spinnability. When viscous solution of hydrophilic polyion complex is drawn at a suitable tension (i.e. at a suitable speed) and spun or wound on a roller, a very fine transparent fiber is obtained. The solvent is evaporated during the winding operation and a dried fiber is presented. The diameter of the fiber is of the order of 5 - 100μ as observed by the microscope, though it is dependent upon the spinning requirements, when experimentally drawn out utilizing a glass rod and the fiber was partially crystallized.

The above-mentioned polyion fibril complex, when component polymer and reaction system are suitably selected under suitable conditions, can be obtained also, for example, by a combination of polycarboxylic acid and polyamine polymer. That is, under the cooperative interaction, a relatively easy transfer of proton from carboxylic acid to amino group is effected. As a result, polycarboxylic acid is electrically charged negative and the protonized polyamine is charged positive. A stable polyion complex can be obtained under such cooperative conditions.

The requirements for producing a stable polyion complex are such that the temperature is in the range of 0°– 80° C, preferably, 20°– 50° C and that there is required a chain length sufficient to exhibit a cooperative association between polyamine and polycarboxylic acid. When polycarboxylic acid (degree of polymerization is a thousand) is used, it is necessary that the length of polyamine be at least hexamer or more, preferably, decamer or more. To explain in another way, decamer or more of polycarboxylic acid is suitable to a long chain polyamine. Where both are short in length, it is necessary that the polymerization degree be 10 or more, preferably 100 or more (one or both).

The requirements for polyion complex to be merely associated or coagulated, not to be in the fibrous structure, are such that the polymerization degree of polycation or polyamine and polycarboxylic acid are relatively small; use is made of polyanion of such type that the dissociation degree of carboxylic groups of polycarboxylic acid is increased by addition of alkali; the higher concentration of polycation or polyamine mixed with polycarboxylic acid is involved; and so on.

The complex so obtained, when the reaction requirements are suitably selected, can be utilized as moulded articles and films. In this case, the growth mechanism of the viscous hydrophilic complex solution and associated complex are essentially the same as the earlier-mentioned complexation.

Let us now explain Examples according to this invention, in which each experiment is conducted at the normal temperature and under the normal pressure.

In the following Examples, "2x polymer" means that, one of $R_1$ and $R_4$ as appearing in the general formula of the above-mentioned integral type polycation, is polymethylene group or $+CH_2\!\!+_n$ wherein "n" represents 2 and the other is xylylene. The same thing is also applicable to "3x polymer." That is, "n" of polymethylene group $+CH_2\!\!+_n$ stands for 3. "Pix polymer" means that, one of $R_1$ and $R_4$ as appearing in the general formula of the integral type polycation, one is piperadine

integrated with a neighboring nitrogen atom and the other is xylylene.

EXAMPLE 1

2g of 2X polymer (NNN'N'-tetramethylethylene-p-xylylenediammonium dichloride) having a molecular weight of about $1 \times 10^4$ was dissolved into 1000 ml of water. The solution was agitated, by a magnetic stirrer, at the speed of several hundred rotations per minute. While a solution obtained by dissolving into 50 ml of water 1.3 g of polymethacrylic acid having a molecular weight of about $7 \times 10^4$ was gradually introduced dropwise into said solution, and no precipitation of complex was observed. After polymethacrylic acid was dropwise mixed a predetermined amount into the resultant solution, agitation was continued for 30 minutes. When the polyion complex solution was allowed to stand, for about 2 days, at room temperature and in the dark, powdered deposite was observed. After the lapse of still further 3 days, the powdered deposit was coagulated to finally obtain fibrous network. The network showed an optical anisotropy when observed under a polarizing microscope, and the width of the fiber was about 10 to 150 μ.

EXAMPLE 2

20 g of PiX polymer (poly-N-P-xylylene-NN'-dimethylpiperazinium dichloride) having a molecular weight of about 8000 was dissolved into 1000 ml of water. According to the same procedure as Example 1, polyacrylic acid having a molecular weight of about 47,000 was dropwise introduced into the solution to form polyion complex. Upon comparison, a fibrous polyion complex was formed at a later time than Example 1. About one week was necessary.

EXAMPLE 3

3 g of methacrylic acid and 5.1 g of 2X polymer NNN'N'-tetramethylethylene-p-xylene-diammonium dichloride) having a molecular weight of about 10000 were dissolved into four-mouth flask (provided with stirrer, nitrogen gas introducing tube and thermometer) having a volume of 1000 ml to obtain a solution of 700 ml. Then, a reaction solution adjusted to PH 7 through the use of NaOH was charged into the solution. The resultant solution was heated to 50° C and a nitrogen gas was passed for about 30 minutes on the solution to remove oxygen in the system. Then, 0.1 g of an initiator (potassium persulfuric acid) was dissolved into 5 ml of water and the resultant solution was charged into said solution to initiate polymerization. After the lapse of 2.5 hours, a transparent, glutinous or jelly-like polyion complex was deposited at the bottom of the flask. The degree of polymerization was 20 to 30%. The deposited product was allowed to stand at room temperature for a suitable time period to cause a water content to be evaporated to permit viscosity to be increased. When it was taken or drawn out with a suitable method, fibers were continuously spun, and polyion complex fibers were manufactured. It was also possible to continuously spun the deposited product directly without evaporating the water content. The thickness of the fiber was about 10 to 80 $\mu$. The thickness of the fiber is controllable according to a spinning requirement.

EXAMPLE 4

2.7 g of acrylic acid and 5.0 g of PiX polymer having a molecular weight of about 8000 were polymerized, according to substantially the same method as Example 3, under the condition of PH 7. A transparent polyion complex deposit was produced like Example 3. When spinning is effected, very transparent polyion complex fibers were formed.

EXAMPLE 5

According to a procedure of Example 3, 2X polymers and methacrylic acid were polymerized under the condition of PH about 3 (i.e. no alkali addition is made). In this case, polyion complex fibers were obtained as a white deposit. The white deposit was filtered and water-washed. Then, hydrochloric acid, chloroacetic acid, formic acid and so on were added to cause it to be dissolved, thus obtaining a solution rich in polyion complex. Then, spinning was effected according to the method of Example 3 and polyion complex fibers were obtained.

EXAMPLE 6

Figure 2:
Figure 3:
Figure 4:
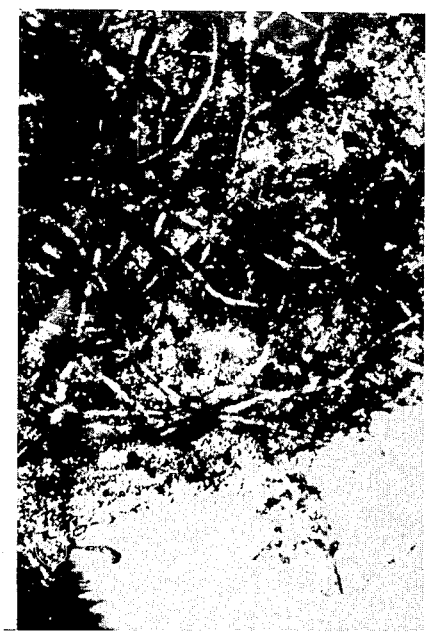
Figure 5:

50 ml of 0.17% of aqueous solution of polymethacrylic acid ($[\eta]_{0.3NKCl\ aq.}^{25°\ C}$ 0.25) was dropwise and agitatedly into 100 ml of 0.15% aqueous solution of 2X polycation ($[\eta]_{0.3NKCl\ aq.}^{25°\ C}$ 0.42) and this dropping operation was continued for 0.5 to 1 hour. At this time, no turbidity of the mixed solution was observed. At the lapse of several hours, however, very fine floating materials were slightly observed through the naked eyes. The floating material gradually grew into a fibrous substance which was at first branched off and then grew into a network structure. To explain the accompanying microscopically taken photographs, FIG. 1 shows a structure photographed at the initial step in which a fibrous structure is already observed and very fine branches occur around the fibers. The diameter of the fiber is about 5 to 8$\mu$. FIG. 2 shows the process in which polyion complex fiber grows into a network structure in which the diameter of the thick fiber is about 12 to 20$\mu$. When it is observed at a polarizing angle of 45° to the fiber axis, then shined fibers are obtained as shown in FIG. 3. From this it will be appreciated that the complex fibers are oriented as they are gathered together. FIG. 5 is a partially enlarged view of FIG. 4 in which a thick fiber present at the center is about 12 to 20$\mu$.

EXAMPLE 7

50ml having a polymerization degree [[$\eta$] methacrylic aqueous solution ($2\times10^{-2}$ mol/l, unit molar concentration)] was dropwise charged agitatedly into 100ml of 3x polymer aqueous solution ($10^{-2}$ mol/l, unit molar concentration) having a polymerization degree ($[\eta]_{0.3NKCl\ aq.}^{25°\ C}$ 0.31). At the end of this dropping operation the solution was left, or slowly agitated, for 100 to 240 hours and a fibrous structure was observed through the naked eyes. Use was made in this Example of polyacrylic acid in place of polymethacrylic acid. In this case, a fibrous structure was also obtained in substantially the same processes as the above Example, except that a relatively long period of time was necessary.

EXAMPLES 8 to 12

Polycations having the following structural formulas were reacted, under substantially the same conditions as in Example 7, with polymethacrylic acid to obtain substantially the same fibrous structures as in Example 7.

Table 1

| Example | Structural formulas | Polymerization degree $[\eta]^{25°\ C}_{0.3NKClaq.}$ |
|---|---|---|
| 8 | 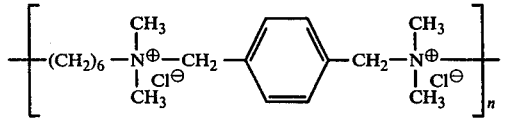 | 0.85 |
| 9 | 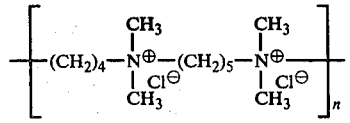 | 0.31 |

Table 1 -continued

| Example | Structural formulas | $[\eta]_{25°C}$ 0.3N:claq. | Polymerization degree |
|---|---|---|---|
| 10 | $\left[-(CH_2)_5-\underset{\underset{CH_3}{\overset{CH_3}{|}}}{\overset{|}{N^{\oplus}}}-(CH_2)_6-\underset{\underset{CH_3}{\overset{CH_3}{|}}}{\overset{|}{N^{\oplus}}}-\right]_n \cdot Cl^{\ominus} \ Cl^{\ominus}$ | 0.28 | |
| 11 | (cyclohexyl-N(CH₃)(Cl⁻)-OH₂-C₆H₄-CH₂-N(CH₃)(Cl⁻)-) polymer structure | 0.29 | |
| 12 | (piperidinium dimethyl chloride polymer structure) | 0.38 | |

The tension tests of the fibers as obtained in Examples 8 to 10 were conducted under the dry condition. The strength of the fibers, in any case, exhibited 2.4 – 3.8 g/d.

EXAMPLE 13

Figure 6:
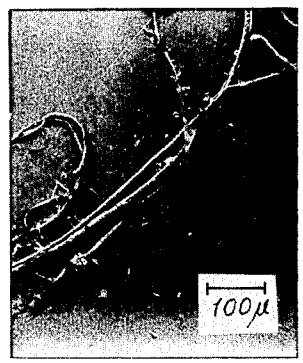

Poly(N-xylylene-N, N, N′, N′-tetramethyl pentamethylene diammonium dichloride) having a polymerization degree of about 136 and polymethylacrylic acid having a polymerization degree of 1020 were sufficiently dissolved, respectively, into an aqueous solution having a concentration of $10^{-2}$ (unit mole/l) and an aqueous solution having a concentration of $1.5 \times 10^{-2}$. Then, both solutions were agitatedly mixed at an equal amount. During the mixing operation the system is uniformly transparent. The mixed solution, while agitated, was left for one or two days and a cotten wool-like floating substance was observed. This substance was, after water-washed, used as a specimen. The specimen was ultrasonically dispersed and then washed. It was centrifugally concentrated to give a concentration. The concentration was dropwise applied to a carbon film. The applied carbon film was, after dried, subject to gold-evaporation and then shadowing. When the specimen was observed under a scan-type electron microscope (JSM-50A), a photograph as shown in FIG. 6 was obtained. The diameter of the fiber was of the order of 3 to 10μ. From this Figure it will be understood that the produced complexes are collected together to form a fibrous configuration.

EXAMPLE 14

42.2g of poly(N-4, 4′ di β hydroxypropoxydiphenyl-2, 2-propane-N, N dimethylammonium chloride) having a limiting viscosity [η] of 0.38 in alcohol solution kept at 30° C was dissolved into 500 ml of ethanol aqueous solution (70:30) to obtain a solution. Into the solution was dropwise introduced slowly and agitatedly a solution obtained by dissolving 43g of polymethacrylic acid (molecular weight, $1.86 \times 10^5$) into 400 ml of ethanol aqueous solution, to obtain a white deposit of polyion complex. The white deposit was separated, water-washed and dried. As a result, the yield was about 82g, i.e. almost 100%. The resultant polyion complex was subjected to element-analysis and spectral analysis and it was proved that 1/5 (average) of polycarboxylic acid per chain was associated with catior seats. In an attempt to mix component polymers, particularly a proper amount of alkali was added to polycarboxylic acid solution and the reaction was conducted through adjustment of the dissociation degree of carboxyl groups. The ratio of polycarboxylic acid to the cation seat of the resultant polyion complex could be varied in the range of 1/6 to 2/1, and the corresponding processability or moldability was obtained. The shaped article is excellent in surface hardiness and anti-static property and it is also established that it is suitably usable as a film material.

EXAMPLE 15

20% of an aqueous solution including 13.8g of poly (2-hydroxy-NN-dimethyl-n-propoxyammonium chloride) and 1l of aqueous solution including 86g of methacrylic acid (molecular weight $1.86 \times 10^5$) are slowly agitatedly added together at room temperature to produce a white polyion complex deposit. The deposit was filtered, water-washed and dried. As a result, yield was 55g. The dried deposit was subjected to an element analysis and spectral analysis. It is found that a cation seat and anion seat were united. Thus, a composition was obtained having 4/5 of free carboxylic acid as a whole.

EXAMPLE 16

Reaction was conducted under substantially the same condition as in Example 15, except that 0.2g of sodium hydroxide or 0.29g of sodium carbonate was added to 0.5l of aqueous solution including 43g of polymethacrylic acid, and that the dissociation degree was adjusted to 0.1 to 0.15. The resultant polyion complex product is such that the proportion of free carboxylic acid was of the order of 3/4 to 2/3 based on the whole volume. The product was in the form of white powders and water-insoluble as well as moldable.

EXAMPLE 17

Reaction was effected under substantially the same condition as in Example 16, except that a combination of polycation and polyanion was varied as shown below.

(a) poly(α-2-hydroxy-n-propoxy-polyoxyethylene-ω-NN-dimethyl-2-hydroxy-n-propylammonium chloride)

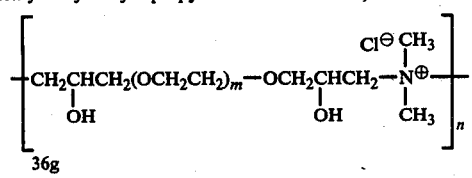

36g (b) poly(α-2-hydroxy-n-propoxypropyleneoxy-NN-dimethyl-2-hydroxy-n-propylammonium chloride)

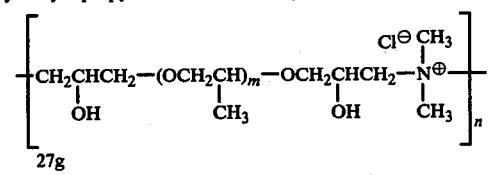

27g (c) poly(α-2-hydroxy-n-propoxyethylene-NN-dimethyl-2-hydroxy-n-propylammonium chloride)

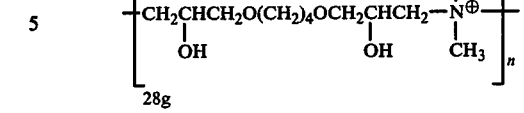

28g

10% of aqueous solution as shown in (a) to (c) were reacted with 5 to 10% of polymethacrylic acid (molecular weight $1.86 \times 10^5$), polyacrylic acid (molecular weight $2.6 \times 10^5$) or polyitaconic acid (molecular weight $7.6 \times 10^4$) in a range of 1 to 10 equivalents to a cation seat, to produce polyion complexes. The proportion of polycarboxylic acid to cation seat united to the associated or companion polymer could be adjusted by adding alkali to the system to permit the dissociation degree of carboxylic acid to be controlled.

Polyion complex so obtained was at any case suitable for molding or shaping.

EXAMPLE 18

Reaction was conducted under substantially the same condition as in Example 15, except that a combination was varied as shown below.

(a) poly(2-hydroxypropoxyphenoxy-NN-dimethyl-2-hydroxypropyl-ammonium chloride)

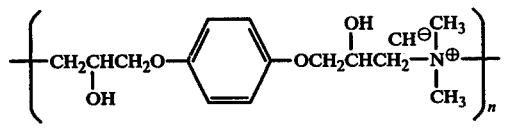

(b) poly(2-hydroxypropoxycyclohexyloxy-NN-dimethyl-2-hydroxypropylammonium chloride)

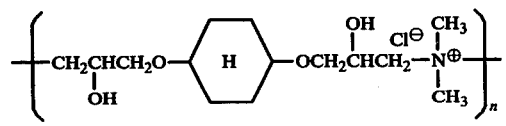

(c) poly(bis-2-hydroxypropyleneterephtalate-NN-dimethyl-ammonium chrolide)

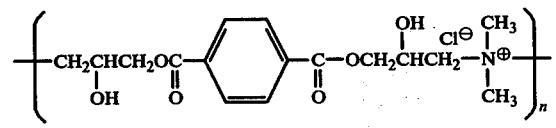

(d) poly(bis-2-hydroxypropylenehexahydroterephthalate-NH-dimethylammonium chrolide)

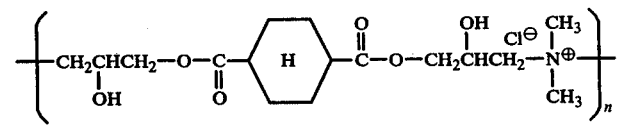

(e) poly(N'N'-bis-2-hydroxypropylene-N'-phenyl-NN dimethylammonium chloride)

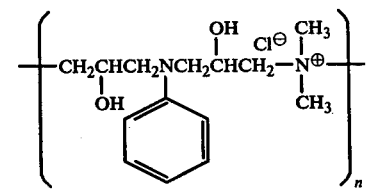

(f) poly(N'N'-bis-2-hydroxypropylene-NN'-dimethyl-p-xylylenediamine-N"N"-dimethylammonium chloride)

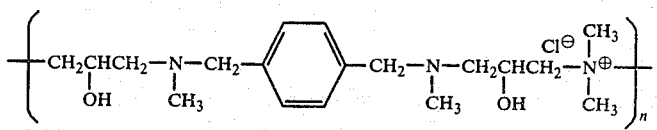

(g) poly(piperazine-NN'-bis-2-hydroxypropylene-N"N"-dimethylammonium chloride)

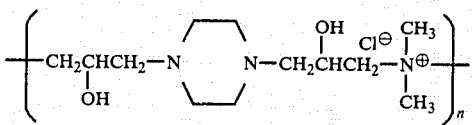

(h) poly(vinyl-NNN-trimethylethylethylammoniumether chloride)

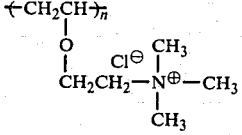

10% of aqueous solution of polycations (a) to (h) were reacted with polyanions as shown below to obtain polyion complexes.

Table 2

| polycation | | polycarboxylic acid | | polyion complex |
|---|---|---|---|---|
| kind | amount added | kind | amount added | yield (g) |
| a | 1.5 | PMAA[1] | 2.2 | 3.2 |
|   |   | PAA[2] | 2.0 | 2.6 |
| b | 1.6 | PMAA | 2.2 | 2.8 |
|   |   | PAA | 2.0 | 2.2 |
| c | 2.3 | PMAA | 2.2 | 3.1 |
|   |   | PAA | 2.0 | 2.3 |
| d | 2.3 | PMAA | 2.3 | 2.7 |
|   |   | PIA[3] | 4.0 | 4.5 |
| e | 3.2 | PMAA | 4.5 | 6.0 |
| f | 3.9 | " | 4.8 | 6.4 |
| g | 3.1 | " | 5.0 | 6.1 |
| h | 4.1 | " | 9.0 | 2.6 | polyion complexes obtained in this Example are all suitable for forming shaped articles and films.

EXAMPLE 19

39g of pentaethylenehexamine and 41g of undecaethylenedodecamine were dissolved into 500 ml of water to obtain a solution. On the other hand, 5% aqueous solution of polymethacrylic acid (polymerization degree 765) and 5% aqueous solution of polyacrylic acid (polymerization degree 340) are respectively prepared. These polyamine solutions, while vigorously agitated, were dropwise added to the polycarboxylic acid solution to immediately produce a white deposit. The deposit was filtered, refined and dried to obtain powdered specimens. The specimen is a plastic, amorphous complex; shows a molar ratio of 1:1; and is capable of forming shaped articles and films. The respective yields are shown below.

Table 3

| polyamine | polycarboxylic acid | Yield | yield percentage(%) |
|---|---|---|---|
| pentaethylenehexamine: 39.0g | PMAA: 86g | 123g | 98.5 |
|  | PAA: 72g | 107g | 96.3 |
| undecaethylenedodecamine: 41.0g | PMAA: 86g | 110g | 94.0 |
|  | PAA: 72g | 108g | 95.6 | in which PMAA denotes polymethacrylic acid and PAA denotes polyacrylic acid.

EXAMPLE 20

1.3g of polymethacrylic acid having a polymerization degree of about 760 was dissolved into 500 ml of water to obtain a solution. On the other hand, 0.7g of straight-chain polyethyleneimine having a polymerization degree of 72 was dissolved into 200 ml of water to obtain a solution. This solution, while agitated, was gradually added dropwise to the polymethacrylic acid. After the dropwise addition was complete, no change was observed in the system and the resultant solution was colourless and transparent. After the lapse of 10 hours — several days, a cotton wool-like floating substance was at first slightly observed and then an increased fibrous mass was appreciably observed with the naked eyes. The fibrous mass was removed and washed. The thickness of the fibrous mass, when observed using an optical microscope, was in the range of 5 to 15μ. The length of the fibrous mass was about 100 to 1000 fold.

EXAMPLE 21

Reaction was conducted under substantially the same conditions as in Example 20, except that in place of polyethyleneimine, use was made in this Example of poly(N-hexylenepiperadine) or poly(N-hexyl-NN'-dimethylxylylenediamine) to obtain a solution having a predetermined concentration; and a tertiary nitrogen position was neutralized using acids, for example, hydrogen chloride to cause it to be in the form of ammonium thus rendering it soluble. As a result, a fibrous complex product substantially the same as in Example 20 was rapidly deposited from a transparent mixed solution. The deposit or precipitation speed could be controlled by adding into the mixed solution a diluted alkali solution, for example, 3% of sodium carbonate solution or 1% of caustic soda solution.

EXAMPLE 22

An aqueous solution including 0.2% of poly-L-lysine hydrobromate (molecular weight: 3.2 × 10⁵) and aqueous solution including 0.2% of polymethacrylic acid (molecular weight: 2.8 × 10⁵) were prepared. These aqueous solutions, while slowly agitated at room temperature, were mixed in such a manner that the polymethacrylic acid solution was excessively added to the poly-L-lysine solution. As a result, a white cotton wool-like deposit was almost instantly precipitated. The product is such that the functional group ratio of poly-L- lysin to polymethacrylic acid was 1:4 to 1:5, and poly-L-lysine component showed a yield of 100%. The white deposit was removed, refined and water-washed. Part of the resultant deposit was used as a specimen. The specimen was ultrasonically dispersed, dropped down on a carbon film evaporated to a glass plate and dried. Then, gold was vacuum evaporated i.e. shadowed on the so-treated glass plate. The resultant film was observed using a scan-type electron microscope (JSM-50A). It was established that a regularly oriented, fibrous structure having fine fibers of the order of 50 to 200 mμ in diameter was obtained. The ultrasonically dispersed supernatant liquid was likewise treated, resulting in a rope structure.

EXAMPLE 23

Reaction was effected, under substantially the same conditions as in Example 22, between poly-L-glutamic acid (molecular weight: 4.6 × 10$^5$) and an atactic polyvinylpyridinehydrochloride (molecular weight: 2.8 × 10$^5$), polyxylyleneammonium chloride, poly-NN-dimethylaminopropyleneoxidehydrochloride, polypropyleneoxide-1-NNN-trimethylammoniumchloride, polydiallyl-NN-dimethylammoniumchloride, polydiallylaminehydrochloride, or poly-L-lysinehydrochloride. The results were substantially the same as in Example 22.

EXAMPLE 24

Reaction and treatment were conducted under substantially the same conditions as in Example 23, except that use was made of poly-D-glutamic acid in place of poly-L-glutamic acid (Example 23). The results were substantially the same as in Example 23.

EXAMPLE 25

Reaction was conducted, under substantially the same conditions as in Example 22, between poly-L-lysine and polyacrylic acid, between poly-L-lysine and poly-L-asparatic acid, between poly-L-lysin and polyitaconic acid and between poly-L-lysin and polystylenemaleic acid. Then, polyion complex was immediately obtained and a mouldable plastic substance was obtained.

From the above Examples it will be understood that polyionic complex according to this invention is utilizable for many industrial applications, for example, for formation of fibers, non-woven fibrocs. filter membranes, fillers etc.

EXAMPLE 26

The mixture of 43 parts of linear polyethyleneimine, H(NHCH$_2$CH$_2$)$_n$NH$_2$([η]=0.31) and 72 parts of polymethacrylic acid, R[CH$_2$CH(CO$_2$H]H([η]=0.52), which contains equimolecular units of both components, was heated at 80 - 180° C to solidify to form a plastic material which was suitable for moulding a film of other shapes. The physical features of this material was almost the same as the dried precipitate obtained from the mixture of acidic solution or alcoholic solution of polyethyleneimine and aqueous polymethacrylic solution.

It was also confirmed that the properties of the complexed material may be varied according to its composition of the component polymers.

What we claim is:

1. A method for preparing a polyion complex which is fibrous or shapable into a mass or film consisting essentially of reacting at a temperature of zero to 80° C a polycarboxylic acid selected from the group consisting of polyacrylic, polymethacrylic, polymaleic, polyitaconic, polyasparatic and polyglutamic acids having a polymerization degree of 5 or more with a polycation having the formula:

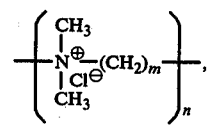

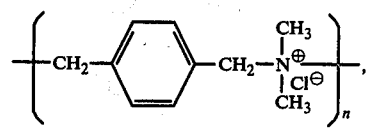

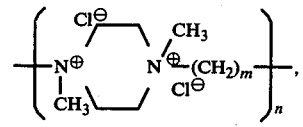

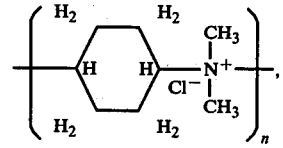

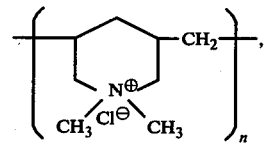

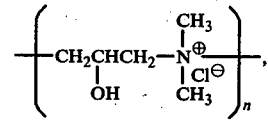

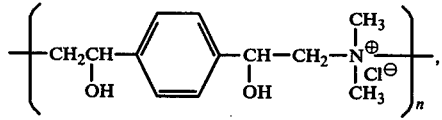

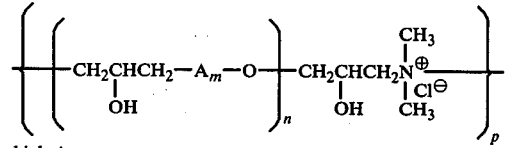

in which A represents

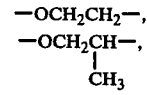

or

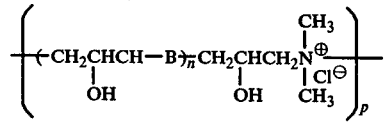

in which B represents

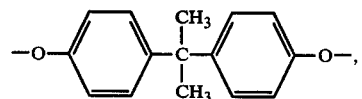

-continued

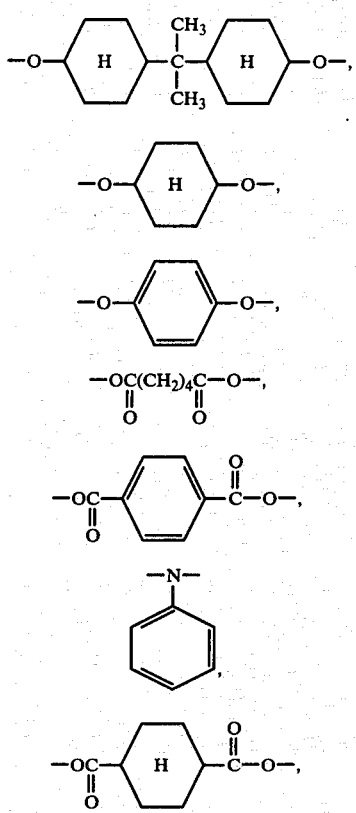

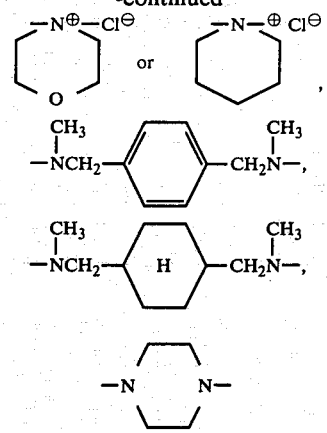

m, n and p represent integers of 5 or more.

2. A method for preparing the polyion complex according to claim 1 wherein the polymerization degree of the polycarboxylic acid is 100 or more, thereby forming fibrous polyion complex.

3. A method for preparing the polyion complex according to claim 1 wherein the polymerization degree (n) of the polycation is 100 or more, thereby forming a fibrous polyion complex.

4. A method for preparing the polyion complex according to claim 1 wherein the polycarboxylic acid is polymethacrylic acid and the polycation is N,N,N',N'-tetramethylethylene-p-xylyenediammonium dichloride polymer.

* * * * *